United States Patent

[11] 3,632,127

| [72] | Inventor | Albert Grosseau<br>Paris, France |
|------|----------|----------------------------------|
| [21] | Appl. No. | 962 |
| [22] | Filed | Jan. 6, 1970 |
| [45] | Patented | Jan. 4, 1972 |
| [73] | Assignee | Societe Anonyme Automobiles Citroen<br>Paris, France |
| [32] | Priority | Jan. 14, 1969 |
| [33] | | France |
| [31] | | 6900432 |

[54] STEERING AXLES WITH LONGITUDINAL ELASTIC SUSPENSION
2 Claims, 6 Drawing Figs.

[52] U.S. Cl..................................................... 280/96,
280/96.1, 74/496
[51] Int. Cl..................................................... B62d 7/16
[50] Field of Search........................................... 280/96, 95,
93, 96.1, 96.2; 72/496, 497, 498

[56] References Cited
UNITED STATES PATENTS

| 1,716,717 | 6/1929 | Wright | 280/96.2 |
| 1,865,130 | 6/1932 | Moorhouse | 74/498 X |
| 2,169,336 | 8/1939 | Best | 280/93 UX |
| 2,997,313 | 8/1961 | Wall | 280/95 X |
| 3,026,124 | 3/1962 | Eyb | 280/96.2 |

FOREIGN PATENTS

| 484,216 | 5/1938 | Great Britain | 74/498 |

Primary Examiner—Benjamin Hersh
Assistant Examiner—John P. Silverstrim
Attorney—Wenderoth, Lind & Ponack ABSTRACT: Steering axle with longitudinal elastic suspension for a vehicle, wherein the steering stability is not impaired by longitudinal wheel beats, this steering axle being characterized in that the steering box is secured to the body of the vehicle through any suitable resilient means permitting slight or low amplitude movements of one portion of the axle carried by said steering box and comprising wheel support members and the steering linkage.

ALBERT GROSSEAU, Inventor

ALBERT GROSSEAU, Inventor

STEERING AXLES WITH LONGITUDINAL ELASTIC SUSPENSION

This invention relates to improvements in steering axles of vehicles, with a view to enable the axle wheels to make low-amplitude beats in the longitudinal direction of the vehicle.

Axles of the type broadly defined hereinabove are already known wherein each wheel is connected to the body or chassis of the vehicle through various suspension members with the interposition of resilient elements so that in addition to the vertical movements the wheel can also perform slight longitudinal movements, this arrangement being capable of efficiently filtering out noise and shocks produced during the operation of the vehicle and transmitted to the body. As a rule, in the known mountings these longitudinal beats or movements are attended by a movement of the wheel in relation to the steering gear casing and to the steering arm, thus involving a slight stray steering action detrimental to the driving or directional stability of the vehicle.

The improvements constituting the subject-matter of this invention consist in connecting each wheel, without any longitudinal elasticity, to the steering box, the latter being resiliently connected to the vehicle body so that longitudinal beats of each wheel are permitted as a consequence of the elastic displacement of the wheel and steering-box unit in relation to the body.

Figure 1:
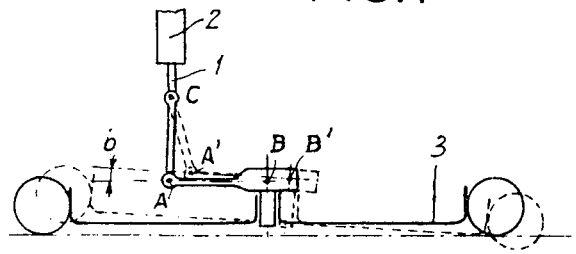
FIG. 1 is a diagrammatic illustration of the principle of a known mounting of steering axle of vehicle.

Referring first to FIG. 1, it will be seen that the steering rack or rod 1 slidably mounted in the steering box 2 is connected to the road wheel through levers CA and AB pivotally attached at C and A. During the longitudinal beats BB' a relative movement of the road wheel 3 in relation to the fixed steering box 2 takes place and is attended by a movement of linkage CAB to positions CA'B' and consequently by a change $b$ in the steering angle, which is obviously detrimental to the road stability of the vehicle.

Figure 2:
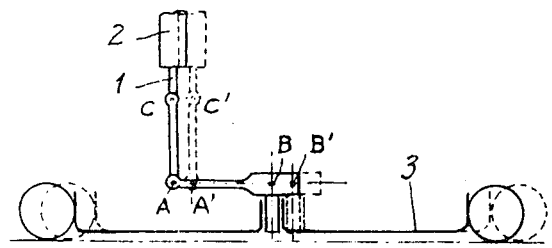
FIG. 2 is a similar illustration of a mounting according to this invention.

In the diagram of FIG. 2 illustrating the principle of this invention a longitudinal beat BB' of road wheel 3 is attended by the same movement (AA'=BB'=CC') of the assembly comprising the wheel, the linkage and the steering box.

Figure 3:
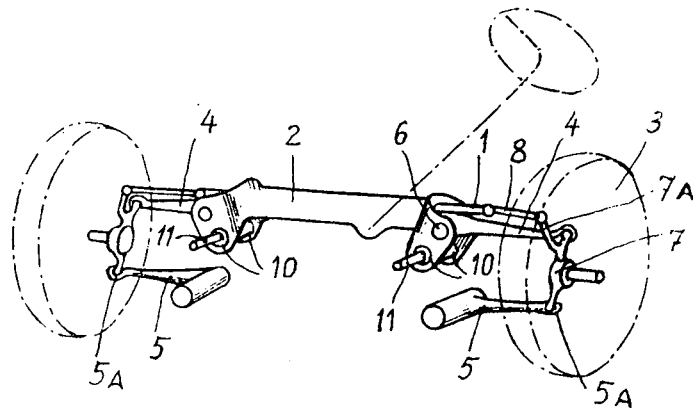
FIG. 3 is a perspective view showing a practical form of embodiment of a steering axle with longitudinal suspension means according to the principle shown in FIG. 2.
Figure 4:
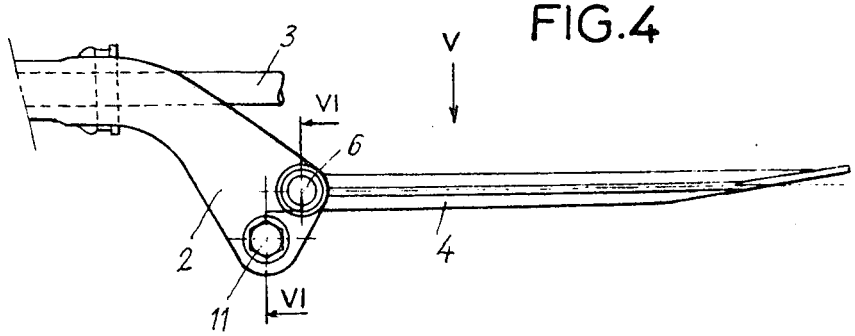
FIGS. 4 and 5 are detail views showing one end of the steering box with its associated members, as seen in lateral view and from the top, respectively.
Figure 5:
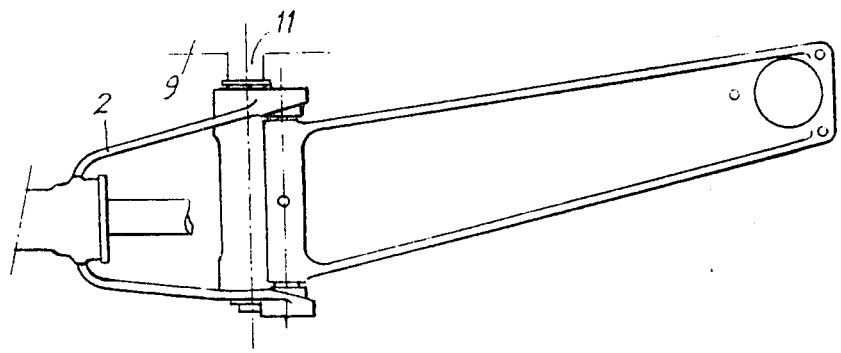
Figure 6:
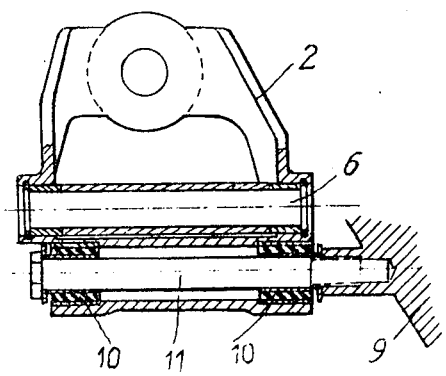
FIG. 6 illustrates by way of example in fragmentary section the preceding assembly connected through resilient means to the body of the vehicle.

In the mounting of the steering axle according to this invention as shown more particularly in FIG. 3 and in FIGS. 4, 5 and 6, the road wheel 3 is supported by a pair of upper and lower transverse or wishbone arms 5 and 4, the arm 4 having its inner end pivotally mounted to a pin 6 carried by the steering box 2 in which the steering rack 1 is slidably mounted. This steering rack 1 is connected to the steering swivel 7 through a link rod 8 and steering arm $7_A$ rigid with said steering swivel 7. The steering box 2 is secured to the body 9 of the vehicle through any suitably resilient means permitting a slight or low-amplitude longitudinal displacement of the assembly comprising the steering box 2, arm 4, rack 1 and link rod 8.

In the specific form of embodiment given herein by way of example, sleeves 10 of elastomeric material are interposed which fit on a pair of shafts 11 rigid with the body and mounted in the forked ends of the steering box.

The lower transverse wishbone arms 5,5 are pivoted to the body of the vehicle with or without the interposition of resilient means permitting a longitudinal displacement of their ends $5_A$.

As an alternative, the lower arms are pivoted to the steering bow (as in the case of wishbone arms 4 of the preceding example) and the upper arms are pivoted directly to the vehicle body.

In any case, the steering arm $7_A$ is disposed preferably in the vicinity of the arm pivotally connected to the steering box.

What is claimed as new is:

1. Steering axle with an elastic longitudinal suspension in which the stability of the steering is not influenced by the longitudinal movements of the wheels comprising a steering box, steering elements in said box, supporting elements for the wheels, a portion of said axle comprising said supporting elements of the wheel and said supporting elements being mounted on said steering box, said box being fixed to the body of the vehicle by elastic means allowing said box and said supporting elements to move in conjunction with slight longitudinal beats of said wheels.

2. Steering axle with longitudinal elastic suspension according to claim 1 wherein the ends of said steering box are mounted with the interposition of sleeves of elastomeric material on shafts fixed to the body of the vehicle.

* * * * *